(12) United States Patent
Lee et al.

(10) Patent No.: US 7,978,294 B2
(45) Date of Patent: Jul. 12, 2011

(54) LIQUID CRYSTAL DISPLAY DEVICE

(75) Inventors: Jae Kyun Lee, Gyeonggi-do (KR); Jae Young Oh, Seoul (KR)

(73) Assignee: LG Display Co., Ltd., Seoul (KR)

( * ) Notice: Subject to any disclaimer, the term of this patent is extended or adjusted under 35 U.S.C. 154(b) by 274 days.

(21) Appl. No.: 12/318,567

(22) Filed: Dec. 31, 2008

(65) Prior Publication Data
US 2009/0207365 A1   Aug. 20, 2009

(30) Foreign Application Priority Data

Feb. 19, 2008  (KR) ........................ 10-2008-0014843

(51) Int. Cl.
  G02F 1/1339 (2006.01)
  G02F 1/13 (2006.01)
  H01L 29/08 (2006.01)
  H01L 31/036 (2006.01)
(52) U.S. Cl. ........................................ 349/141; 257/59
(58) Field of Classification Search ............... 349/39, 349/53–55, 139, 141, 102, 156, 84; 345/98; 257/E21.575, 59, 72, 40; 438/30, 51
See application file for complete search history.

(56) References Cited

U.S. PATENT DOCUMENTS

| | | | | |
|---|---|---|---|---|
| 5,852,482 A * | 12/1998 | Kim | ............................. | 349/46 |
| 6,650,389 B1 * | 11/2003 | Sakamoto | ..................... | 349/141 |
| 6,950,165 B2 * | 9/2005 | Matsumoto et al. | .......... | 349/141 |
| 7,542,119 B2 * | 6/2009 | Ko et al. | ........................ | 349/141 |
| 7,700,949 B2 * | 4/2010 | Song et al. | ...................... | 257/59 |
| 7,724,325 B2 * | 5/2010 | Kim | ............................... | 349/108 |
| 7,884,916 B2 * | 2/2011 | Choi et al. | .................... | 349/156 |
| 2005/0140903 A1 * | 6/2005 | Park et al. | ..................... | 349/141 |
| 2005/0270435 A1 * | 12/2005 | Shiau et al. | .................... | 349/54 |
| 2006/0050219 A1 * | 3/2006 | Lee | ................................ | 349/141 |
| 2007/0052896 A1 * | 3/2007 | Eom et al. | ..................... | 349/139 |
| 2007/0171336 A1 * | 7/2007 | Kim et al. | ..................... | 349/102 |
| 2008/0012008 A1 * | 1/2008 | Song et al. | ...................... | 257/40 |
| 2008/0121893 A1 * | 5/2008 | Kim et al. | ....................... | 257/72 |
| 2008/0252828 A1 * | 10/2008 | Shin et al. | ..................... | 349/106 |
| 2009/0015780 A1 * | 1/2009 | Choi et al. | ..................... | 349/156 |

FOREIGN PATENT DOCUMENTS

| | | |
|---|---|---|
| CN | 1448762 | 10/2003 |
| CN | 1637558 | 7/2005 |

\* cited by examiner

*Primary Examiner* — Akm E Ullah
(74) *Attorney, Agent, or Firm* — Morgan, Lewis & Bockius LLP

(57) ABSTRACT

A liquid crystal display device is disclosed. The disclosed liquid crystal display device includes gate lines, data lines formed to intersect with the gate lines, thereby defining sub-pixel regions, vertical common lines formed in parallel to the data lines such that at least one vertical common line is arranged for one pixel region, which is constituted by at least three sub-pixel regions, thin film transistors each connected to a corresponding one of the gate lines and a corresponding one of the data lines, pixel electrodes each connected to a corresponding one of the thin film transistors, and common electrodes each connected to a corresponding one of the vertical common lines.

12 Claims, 17 Drawing Sheets

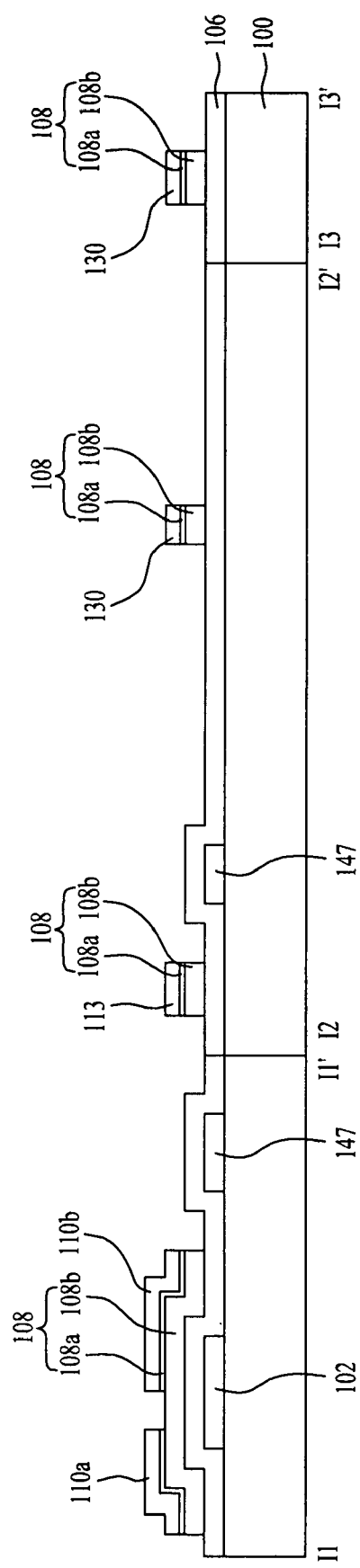

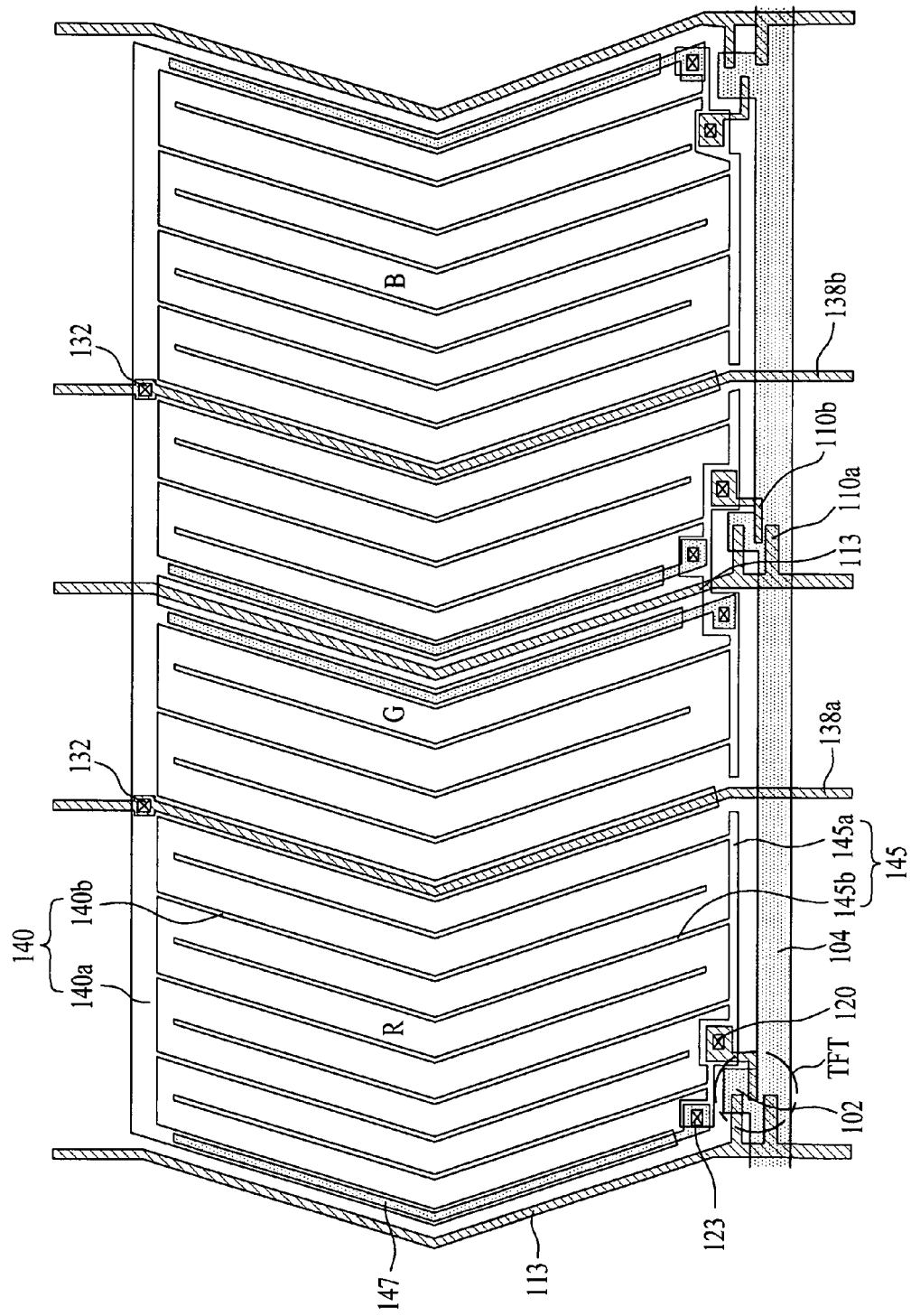

LIQUID CRYSTAL DISPLAY DEVICE

This application claims the benefit of the Korean Patent Application No. 10-2008-0014843, filed on Feb. 19, 2008, which is hereby incorporated by reference as if fully set forth herein.

BACKGROUND OF THE INVENTION

1. Field of the Invention

The present invention relates to a liquid crystal display device, and more particularly, to a liquid crystal display device capable of achieving an enhancement in aperture ratio, and an enhancement in picture quality reliability.

2. Discussion of the Related Art

Generally, there are liquid crystal display (LCD) devices of various modes according to various alignments of liquid crystal molecules. For example, LCD devices are classified into a twisted nematic mode, in which liquid crystal directors are controlled by a vertical electric field, and an in-plane switching mode, in which liquid crystal directors are controlled by a horizontal electric field.

The in-plane switching mode LCD device includes a color filter array substrate, a thin film array substrate arranged to face the color filter array substrate, and a liquid crystal layer interposed between the color filter array substrate and the thin film array substrate. The color filter array substrate includes a black matrix for preventing leakage of light, and color filter layers formed on the black matrix, to render a desired color. The thin film transistor array substrate includes gate lines and data lines defining unit pixels, thin film transistors formed at respective intersections of the gate lines and data lines, and common electrodes and pixel electrodes formed in parallel, to form a horizontal electric field.

In order to secure a desired capacitance of each storage capacitor, the in-plane switching mode LCD device has a structure in which a common line, which is formed such that it is connected with the common electrode in each pixel region, is overlapped with the pixel electrode in the pixel region under the condition in which an insulating film is interposed between the common line and the pixel electrode. In this case, a reduction in aperture ratio occurs due to the common lines arranged over and beneath each pixel region. Since the common lines are formed using the same metal layer as that of the gate lines, there may be a short circuit between the common electrodes and the gate lines. In order to prevent a failure caused by a short circuit between the common electrodes and the gate lines, a sufficient spacing distance should be secured between the common electrodes and the gate lines. For this reason, a reduction in aperture ratio occurs.

As the LCD device has a larger area, the length of the common lines also increases. As a result, the resistance of the common lines, which is proportional to the length of the common lines, is also increased. In this case, there may be a phenomenon that the common voltage is distorted or delayed. When the area of the common lines is increased to solve this problem, a reduction in aperture ratio occurs. Furthermore, a parasitic capacitor is formed between the gate line and the common line in each sub-pixel. This parasitic capacitor causes cross-talk, a flicker phenomenon, image sticking, etc.

SUMMARY OF THE INVENTION

Accordingly, the present invention is directed to a liquid crystal display device that substantially obviates one or more problems due to limitations and disadvantages of the related art.

An object of the present invention is to provide a liquid crystal display device capable of achieving an enhancement in aperture ratio, and an enhancement in picture quality reliability.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a liquid crystal display device comprises: gate lines; data lines formed to intersect with the gate lines, thereby defining sub-pixel regions; vertical common lines formed in parallel to the data lines such that at least one vertical common line is arranged for one pixel region, which is constituted by at least three sub-pixel regions; thin film transistors each connected to a corresponding one of the gate lines and a corresponding one of the data lines; pixel electrodes each connected to a corresponding one of the thin film transistors; and common electrodes each connected to a corresponding one of the vertical common lines.

The liquid crystal display device according to the present invention has the following effects.

First, the liquid crystal display device according to the present invention achieves an enhancement in aperture ratio corresponding to about 10 to 16% by forming the common lines and storage electrodes in parallel to the data lines, as compared to the case in which the common lines and storage electrodes are formed over and beneath each pixel region.

Second, the storage electrodes made of the gate metal material are formed such that the storage electrodes are parallel with the data lines, namely, the storage electrodes are formed on a layer different from the layer, on which the data lines are formed. Accordingly, it is possible to reduce the spacing distance for reducing the possibility of a failure caused by short circuit, and thus to achieve an enhancement in aperture ratio.

Third, since the common lines are formed to be parallel to the data lines, the length of the common lines is reduced, as compared to the case in which the common lines are formed to be parallel to the gate lines. Accordingly, the resistance of the common lines is reduced. As a result, it is possible to prevent the common voltage from being distorted or delayed, and to reduce a flicker phenomenon caused by the resistance of the common lines and capacitance.

Since a common voltage from a driver integrated circuit (IC) is directly applied to the vertical common lines, it is possible to prevent the common voltage from being distorted.

Fourth, since the common lines are formed to be parallel to the data lines, there is no cross-talk caused by a parasitic capacitor formed between the gate lines and the common lines in conventional cases. It is also possible to eliminate direct current (DC) components from the common electrodes, and thus to solve an associated problem such as image sticking.

Fifth, since an increase in brightness is achieved in accordance with the enhanced aperture ratio, it is possible to eliminate the use of a diffusion sheet or a prism sheet. Also, it is possible to obtain a high aperture ratio, without using an organic insulating material such as expensive photo acryl. Thus, a reduction in costs and processes is achieved.

Sixth, since the black matrix is formed such that the ratio of the minimum line width to the maximum line width is 0.7 or less, it is possible to solve a visibility problem caused by a line width difference in the black matrix. Also, the sub-pixel regions have the same aperture width. Accordingly, it is possible to reduce a color deviation and color mixing among the sub-pixel regions.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and along with the description serve to explain the principle of the invention. In the drawings:

FIGS. 3A to 3D are sectional views illustrating a method for fabricating the thin film transistor substrate shown in FIG. 2;

DETAILED DESCRIPTION OF THE INVENTION

Reference will now be made in detail to the preferred embodiments of the present invention associated with a liquid crystal display device, examples of which are illustrated in the accompanying drawings.

Figure 1:
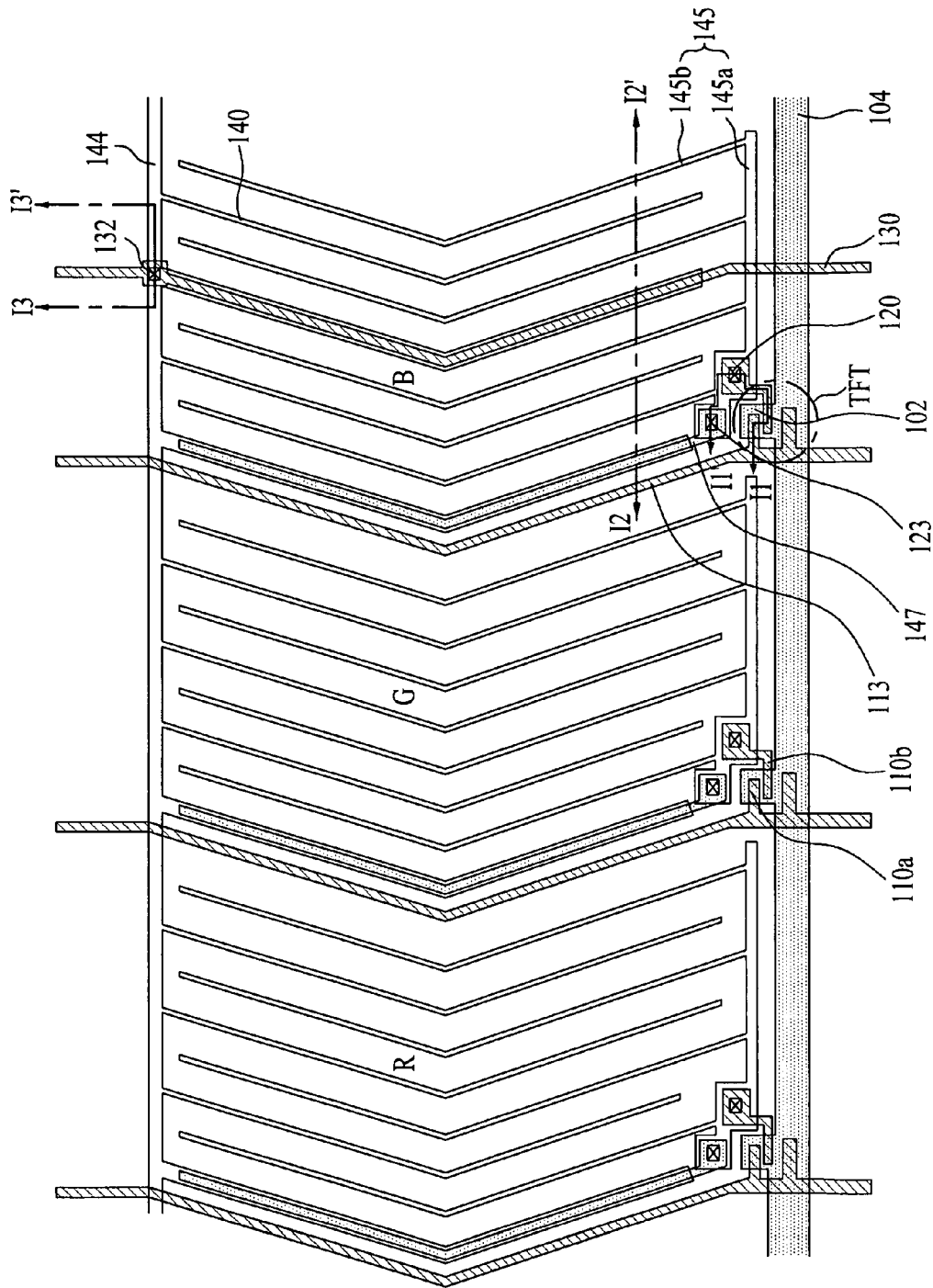
FIG. 1 is a plan view illustrating a thin film transistor substrate of an in-plane switching (IPS) liquid crystal display (LCD) device according to a first embodiment of the present invention.
Figure 2:
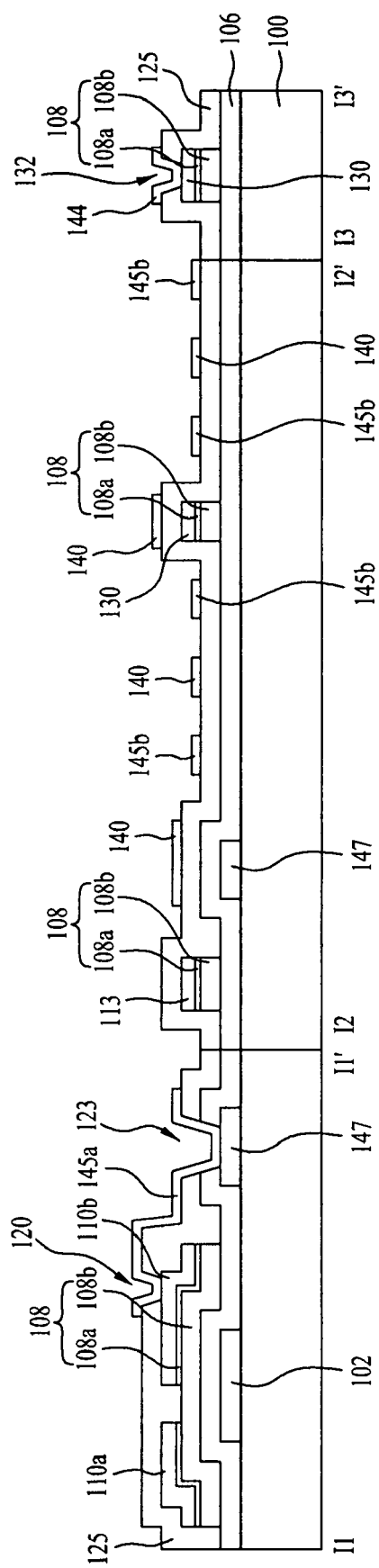
FIG. 2 is a cross-sectional view taken along the lines I1-I1' to I3-I3' of FIG. 1, illustrating the thin film transistor substrate shown in FIG. 1.

FIG. 1 is a plan view illustrating a thin film transistor substrate of an in-plane switching (IPS) liquid crystal display (LCD) device according to a first embodiment of the present invention. FIG. 2 is a cross-sectional view taken along the lines I1-I1' to I3-I3' of FIG. 1, illustrating the thin film transistor substrate.

The IPS LCD device shown in FIGS. 1 and 2 includes a thin film transistor substrate 100 defined with a plurality of pixel regions each having red (R), green (G), and blue (B) sub-pixel regions. The IPS LCD device also includes a plurality of gate lines 104 formed on the substrate 100, and a plurality of data lines 113 formed on the substrate 100 to intersect with the gate lines 104 under the condition in which a gate insulating film 106 is interposed between the gate lines 104 and the data lines 113, and thus to define the sub-pixel regions. The IPS LCD device further includes thin film transistors TFT formed at respective intersections of the gate lines 104 and data lines 113, pixel electrodes 145 respectively connected to the thin film transistors TFT, common electrodes 140 each adapted to form a horizontal electric field in the corresponding sub-pixel region, together with the corresponding pixel electrode 145, and horizontal common lines 144 formed in parallel to the gate lines 104. Each horizontal common line 144 is connected with the common electrodes 140 in the corresponding sub-pixel regions. The IPS LCD device further includes vertical common lines 130 forming a mesh structure, together with the horizontal common lines 144, and storage electrodes 147 formed in parallel with each data line 113 at one side of the data line 113 such that the storage electrodes 147 overlap with the corresponding common electrodes 140. The horizontal common lines 144 are made of the same material as the pixel electrodes 145.

Since the horizontal common lines 144 and vertical common lines 130 form a mesh structure, it is possible to achieve a reduction in load, and thus to minimize the load.

Each pixel electrode 145 is connected to a drain electrode 110b of the corresponding thin film transistor TFT via a drain contact hole 120 penetrating through a passivation film 125. The pixel electrode 145 has a horizontal portion 145a connected to the corresponding storage electrode 147 via a storage contact hole 123 penetrating through the gate insulating film 106 and passivation film 125, and a finger portion 145b forming a horizontal electric field, together with the corresponding common electrode 140.

The vertical common lines 130 are formed on the same layer as the layer, on which the data lines 113 are formed, using a source/drain material, to cross regions most insensible to brightness, namely, the B sub-pixel regions. Each vertical common line 130 is connected to the corresponding horizontal common lines 144 via common line contact holes 132 extending through the passivation film 125. A common voltage from a driver integrated circuit (IC) is directly applied to each vertical common line 130. Accordingly, it is possible to prevent the common voltage from being distorted.

Each storage electrode 147 is made of a gate metal material. Each storage electrode 147 is overlapped with the corresponding common electrode 140 via the gate insulating film 106 and passivation film 125, to form a storage capacitor.

Each thin film transistor TFT includes a gate electrode 102 branched from the corresponding gate line 104. The gate insulating film 106 is also included in the thin film transistor TFT. The gate insulating film 106 is formed over the entire upper surface of the substrate 100 formed with the gate electrode 102. The thin film transistor TFT also includes a semiconductor layer 108 formed on the gate insulating film 106 to overlap with the gate electrode 102. The semiconductor layer 108 includes an ohmic contact layer 108a and an active layer 108b. The thin film transistor TFT further includes a source electrode 110a formed on the semiconductor layer 108 such that the source electrode 110a is branched from the corresponding data line 113. The drain electrode 110b, which is also included in the thin film transistor TFT, is formed on the semiconductor layer 108 to face the source electrode 110a.

Since the vertical common lines 130 are formed in the B sub-pixel regions, using the source/drain material, such that the vertical common lines 130 extend in parallel to the data lines 113, it is possible to reduce the length of the common lines, as compared to the case in which the common lines are formed to be parallel with the gate lines 104. As a result, the resistance of the common lines themselves is also reduced. Thus, it is possible to prevent the common voltage from being distorted or delayed, and to reduce a flicker phenomenon caused by the resistance of the common lines and capacitance.

As the storage electrodes 147 made of the gate metal material are formed such that the storage electrodes 147 are parallel with the data lines 113, namely, the storage electrodes 147 are formed on a layer different from the layer, on which the data lines 113 are formed, it is possible to reduce the spacing distance for reducing the possibility of a failure caused by short circuit, and thus to achieve an enhancement in aperture ratio.

In the LCD device, in which the vertical common lines 130 cross the B sub-pixel regions, the average aperture ratio of each pixel region is about 58 to 60% with respect to a 42-inch high-definition (HD) model.

Although not shown, the thin film transistor substrate 100 is assembled with a color filter substrate under the condition in which a liquid crystal layer is interposed between the thin film transistor substrate 100 and the color filter substrate. The color filter substrate includes a black matrix layer for shielding light in a region except for the sub-pixel regions, and color filter layers for rendering a desired color.

FIGS. 3A to 3D are sectional views illustrating a method for fabricating the thin film transistor substrate shown in FIG. 2.

Figure 3A:
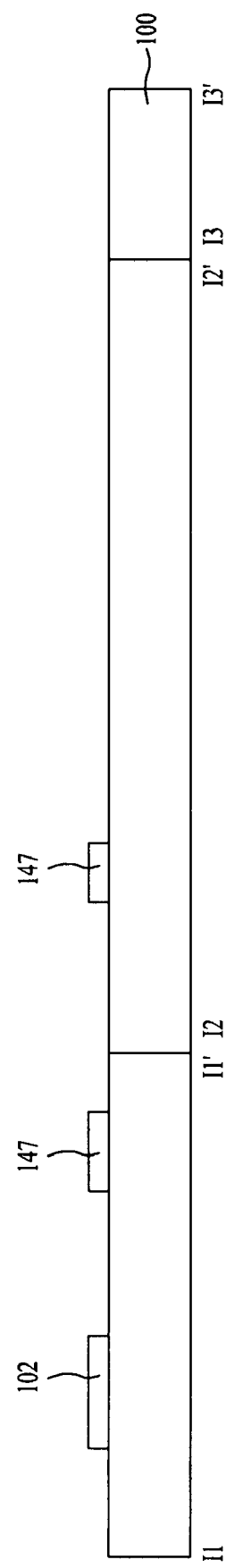

Referring to FIG. 3A, the gate electrodes 102 and storage electrodes 147 are formed on the substrate 100.

In detail, a gate metal layer is formed over the substrate 100 in accordance with a deposition method such as a sputtering method. The gate metal layer is patterned in accordance with a photolithography process using a mask and etching process, to form the gate electrodes 102 and storage electrodes 147.

The gate metal layer is formed to have a single-layer structure or a multilayer, using a metal selected from molybdenum (Mo), aluminum (Al), aluminum-neodymium (AlNd), copper (Cu), chromium (Cr), titanium (Ti), and an alloy thereof.

Referring to FIG. 3B, the gate insulating film 106, semiconductor layer 108, and a source/drain pattern are sequentially formed on the substrate 100 including the gate electrodes 102 and storage electrodes 147.

In detail, the gate insulating film 106, an amorphous silicon (a-Si) layer, and an impurity ($n^+$)-doped amorphous silicon layer are sequentially formed over the entire upper surface of the substrate 100 including the gate electrodes 102 and storage electrodes 147, in accordance with a deposition method such as a plasma enhanced chemical vapor deposition (PECVD) method. Thereafter, a source/drain metal layer is formed in accordance with a deposition method such as a sputtering method. The source/drain metal layer is patterned in accordance with a photolithography process using a mask and etching process, to form the semiconductor layer 108, which includes the ohmic contact layer 108a and active layer 108b, the data lines 113, the vertical common lines 130, and the source/drain pattern, which includes the source electrodes 110a and drain electrodes 110b. A diffraction exposure mask or a half-tone mask is used, in order to expose a channel portion between the source electrodes 110a and drain electrodes 110b.

The gate insulating film 106 is made of an inorganic insulating material such as a silicon oxide ($SiO_x$) or a silicon nitride ($SiN_x$). The source/drain metal layer is formed to have a single-layer structure or a multilayer structure, using a metal selected from molybdenum (Mo), aluminum (Al), aluminum-neodymium (AlNd), copper (Cu), chromium (Cr), titanium (Ti), molybdenum-titanium alloy (MoTi), molybdenum-niobium alloy (MoNb), titanium-niobium alloy (TiNb), and an alloy thereof.

Figure 3C:
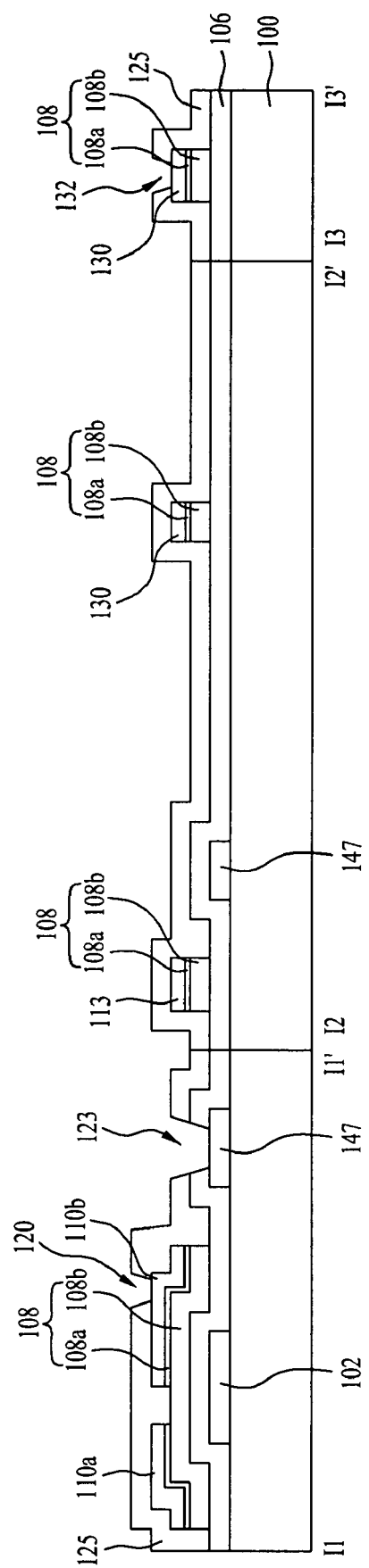

Referring to FIG. 3C, the passivation film 125, which includes the drain, storage, and common line contact holes 120, 123, and 132, are formed on the source/drain pattern.

In detail, the passivation film 125 is formed on the source/drain pattern, which includes the data lines 113, vertical common lines 130, source electrodes 110a, and drain electrodes 110b. Thereafter, the passivation film 125 is patterned in accordance with a photolithography process using a mask and etching process, to form the drain contact holes 120, through which respective drain electrodes 110b are exposed, the storage contact holes 123, through which respective storage electrodes 147 are exposed, and the common line contact holes 132, through which respective vertical common lines 130 are exposed.

The formation of the passivation film 125 is achieved by depositing an inorganic insulating material, which may be the same material as that of the gate insulating film 106, in accordance with a deposition method such as a PECVD method, or coating an organic insulating material such as an acryl-based organic compound, benzocyclobuten (BCB) or perfluorocyclobutane (PFCB) having a low dielectric constant in accordance with a coating method such as a spin coating method or a spinless coating method.

Figure 3D:
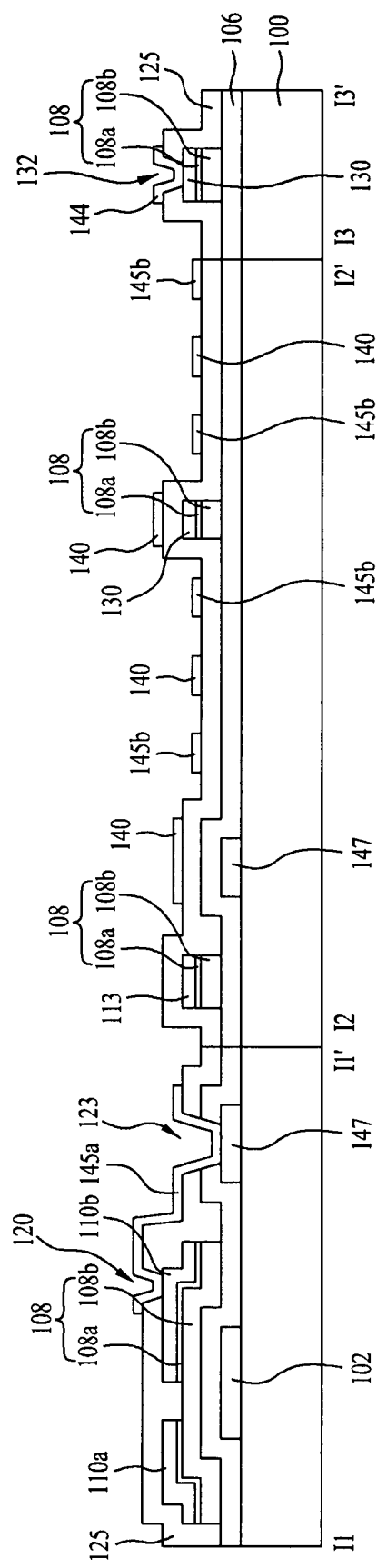

Referring to FIG. 3D, the pixel electrodes 145, common electrodes 140, and horizontal common lines 144 are formed on the passivation film 125.

In detail, a transparent conductive material is deposited over the passivation film 125. The deposited transparent conductive material is then patterned in accordance with a photolithography and etching process, to form the horizontal portion 145a of each pixel electrode 145 electrically connected to the corresponding drain electrode 110b via the corresponding drain contact hole 120 while being electrically connected to the corresponding storage electrode 147 via the corresponding storage contact hole 123, and the finger portion 145b of each pixel electrode 145 branched from the horizontal portion 145a of the pixel electrode 145. Also, each horizontal common line 144, which is electrically connected to the corresponding vertical common line 130 via the corresponding common line contact hole 132, and each common electrode 140, which is branched from the corresponding horizontal common line 144 such that the common electrode 140 is parallel to the finger portion 145b of the corresponding pixel electrode 145, are formed.

Each storage electrode 147 and each common electrode 140, which correspond to each other, form a storage capacitor under the condition in which the gate insulating film 106 and passivation film 125 are interposed between the storage electrode 147 and the common electrode 140.

Since the vertical common lines 130 are formed in the B sub-pixel regions such that the vertical common lines 130 extend in parallel to the data lines 113, it is possible to reduce the length of the common lines, as compared to the case in which the common lines are formed to be parallel with the gate lines 104. As a result, the resistance of the common lines themselves is also reduced. Thus, it is possible to prevent the common voltage from being distorted or delayed.

Also, each storage electrode 147, which forms a storage capacitor, is formed at one side of the corresponding data line 113 to extend in parallel to the data line 1 13, without being formed over or beneath the corresponding pixel region. Accordingly, an enhancement in aperture ratio is achieved. Since the storage electrode 147 is formed, using a gate metal material, on a layer different from the layer, on which the data lines 113 are formed, it is possible to reduce the spacing distance for reducing the possibility of a failure caused by short circuit, and thus to achieve an enhancement in aperture ratio.

Figure 4:
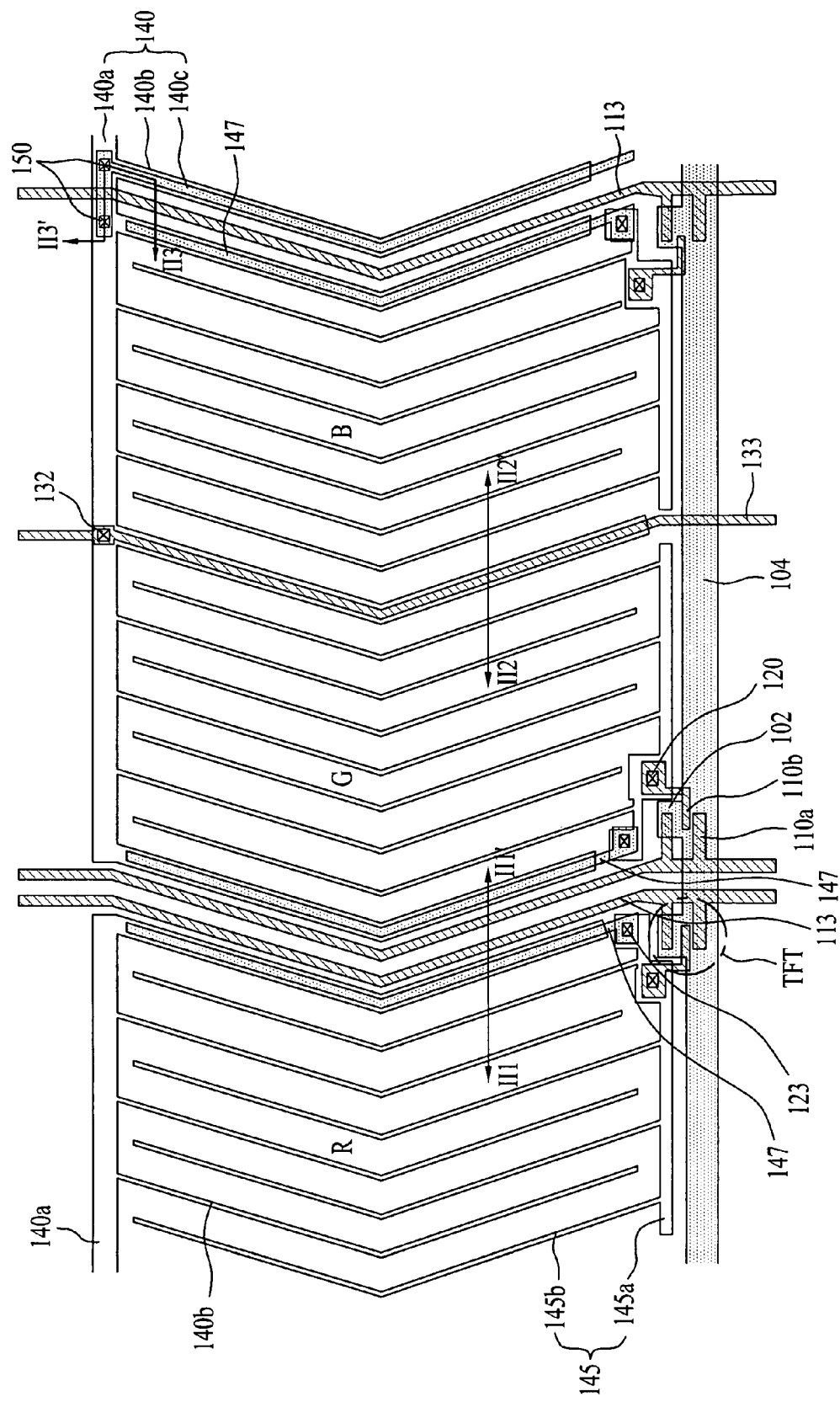
FIG. 4 is a plan view illustrating a thin film transistor substrate of an IPS LCD device according to a second embodiment of the present invention.
Figure 5:
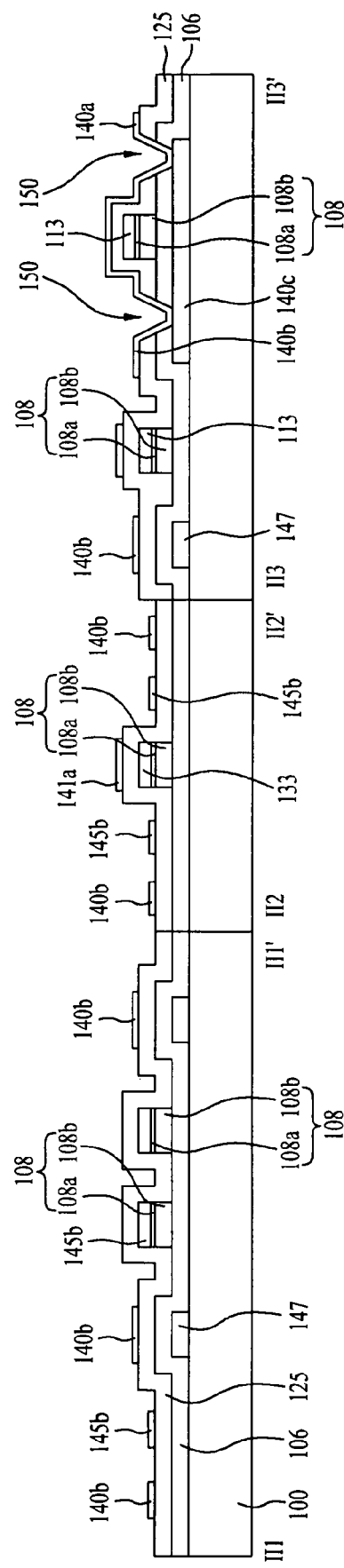
FIG. 5 is a cross-sectional view taken along the lines II1-II1' to II3-II3' of FIG. 4, illustrating the thin film transistor substrate shown in FIG. 4.

FIG. 4 is a plan view illustrating a thin film transistor substrate of an IPS LCD device according to a second embodiment of the present invention. FIG. 5 is a cross-sectional view taken along the lines III1-III1' to III3-III3' of FIG. 4, illustrating the thin film transistor substrate.

No description will be given of the constituent elements of the IPS LCD device shown in FIG. 4, which are identical to those of the thin film transistor substrate in the IPS LCD device shown in FIG. 1.

Referring to FIGS. 4 and 5, the data lines 113 respectively formed in the R and G sub-pixel regions of each pixel region are arranged adjacent to each other. Also, the thin film transistors TFT respectively formed in the R and G sub-pixel regions of each pixel region are arranged adjacent to each other.

Each common electrode 140 has a horizontal portion 140a formed to be parallel to the corresponding gate line 104, a finger portion 140b connected to the horizontal portion 140a, to form a horizontal electric field, together with the finger portion 145b of the corresponding pixel electrode 145, and an overlapping portion 140c formed to overlap with the finger portion 140b at one side of the data line 113 in the B sub-pixel region of the corresponding pixel region. A vertical common line 133 is formed to be shared by the G and B sub-pixel regions of each pixel region. The vertical common line 133 is overlapped with the finger portion 140b of one common electrode 140 in the pixel region. The overlapping portion 140c of each common electrode 140 may be connected to the horizontal portion 140a of the common electrode 140 via a plurality of common electrode contact holes 150, in order to achieve an enhancement in the contactability between the overlapping portion 140c and the horizontal portion 140a.

A common voltage from the driver IC is directly applied to each vertical common line 133. Accordingly, it is possible to prevent the common voltage from being distorted.

In the LCD device, in which one vertical common line 133 is formed in each pixel region such that the vertical common line 133 is shared by the G and B sub-pixel regions of the pixel region, the average aperture ratio of each pixel region is about 60 to 62% with respect to a 42-inch high-definition (HD) model.

Since the vertical common lines 133 are formed in the B sub-pixel regions such that the vertical common lines 133 extend in parallel to the data lines 113, it is possible to reduce the common lines, as compared to the case in which the common lines are formed to be parallel with the gate lines 104. As a result, the resistance of the common lines themselves is also reduced. Thus, it is possible to prevent the common voltage from being distorted or delayed.

Also, each storage electrode 147, which forms a storage capacitor, is formed at one side of the corresponding data line 113 to extend in parallel to the data line 1 13, without being formed over or beneath the corresponding pixel region. Accordingly, an enhancement in aperture ratio is achieved. Since the storage electrode 147 is formed, using a gate metal material, on a layer different from the layer, on which the data lines 113 are formed, it is possible to reduce the spacing distance for reducing the possibility of a failure caused by short circuit, and thus to achieve an enhancement in aperture ratio.

Although one vertical common line is formed in each pixel region in the above-described embodiment, a plurality of vertical common lines may be formed in each pixel region, as shown in FIGS. 6 to 9.

FIGS. 6 to 9 are views illustrating a thin film transistor substrate of an IPS LCD device according to a third embodiment of the present invention.

No description will be given of the constituent elements of the IPS LCD device shown in FIGS. 6 to 9, which are identical to those of the first and second embodiments.

Figure 6:
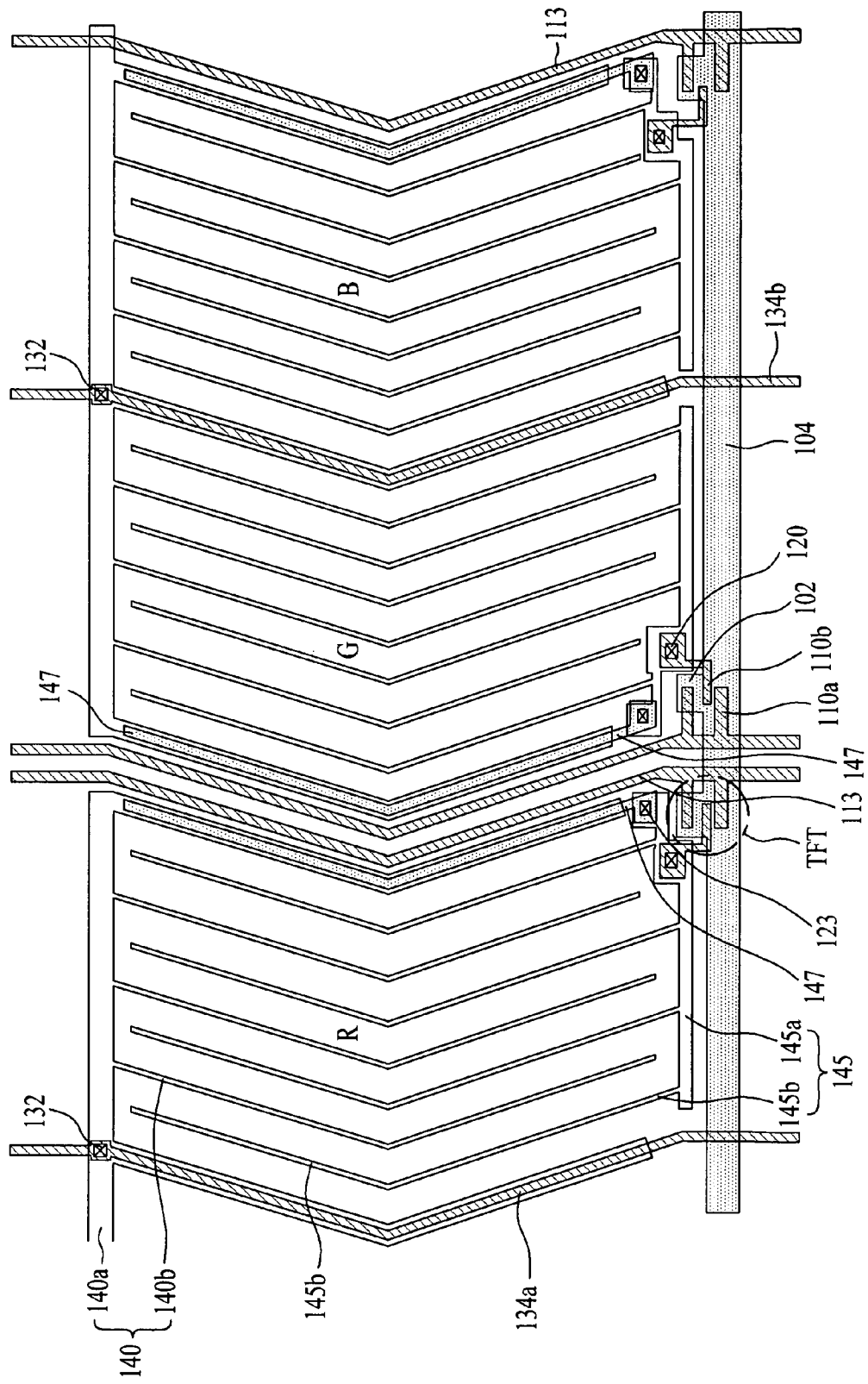
FIGS. 6 to 9 are views illustrating a thin film transistor substrate of an IPS LCD device according to a third embodiment of the present invention.

Referring to FIG. 6, the data lines 113 respectively formed in the R and G sub-pixel regions of each pixel region are arranged adjacent to each other. Also, the thin film transistors TFT respectively formed in the R and G sub-pixel regions of each pixel region are arranged adjacent to each other. The data line 113 formed in the B sub-pixel region of each pixel region is arranged at the right side of the B sub-pixel region. In each pixel region, the corresponding vertical common line includes a first vertical common line 134a formed at the left side of the R sub-pixel region, and a second vertical common line 134b formed to be shared by the G and B sub-pixel regions. The first and second vertical common lines 134a and 134b are connected to the horizontal portions 140a of the corresponding common electrodes 140 via common line contact holes 132, respectively.

Since a common voltage from the driver IC is directly applied to the first and second vertical common lines 134a and 134b, it is possible to prevent the common voltage from being distorted.

A storage electrode 147 is formed at one side of the data line 113 in each sub-pixel region such that the storage electrode 147 is parallel to the data line 113. Where storage electrodes 147 are formed at opposite sides of the data line 113 such that the storage electrodes 147 correspond to respective sub-pixel regions, an electric field distortion may be generated between the data line 113 and the storage electrodes 147. In this case, liquid crystal molecules may be disorderly arranged. As a result, a light leakage phenomenon occurs when the viewer laterally views a region between each storage electrode 147 and the data line 113. In this case, the width of the black matrix should be increased to avoid the light leakage phenomenon. In this case, however, there is a problem of a reduction in aperture ratio. To this end, the storage electrodes are formed such that one storage electrode is arranged at one side of the data line 113 in each sub-pixel region, in order to achieve a viewing angle control (VAC). In this case, it is possible to minimize a voltage variation between the data line 113 and the storage electrode 147 at the other side of the data line 113 where no storage electrode is arranged.

In the LCD device, in which the vertical common line in each pixel region includes the first vertical common line 134a formed at the left side of the R sub-pixel region, and the second vertical common line 134b formed to be shared by the G and B sub-pixel regions, the average aperture ratio of each pixel region is about 60 to 62% with respect to a 42-inch high-definition (HD) model.

Figure 7A:
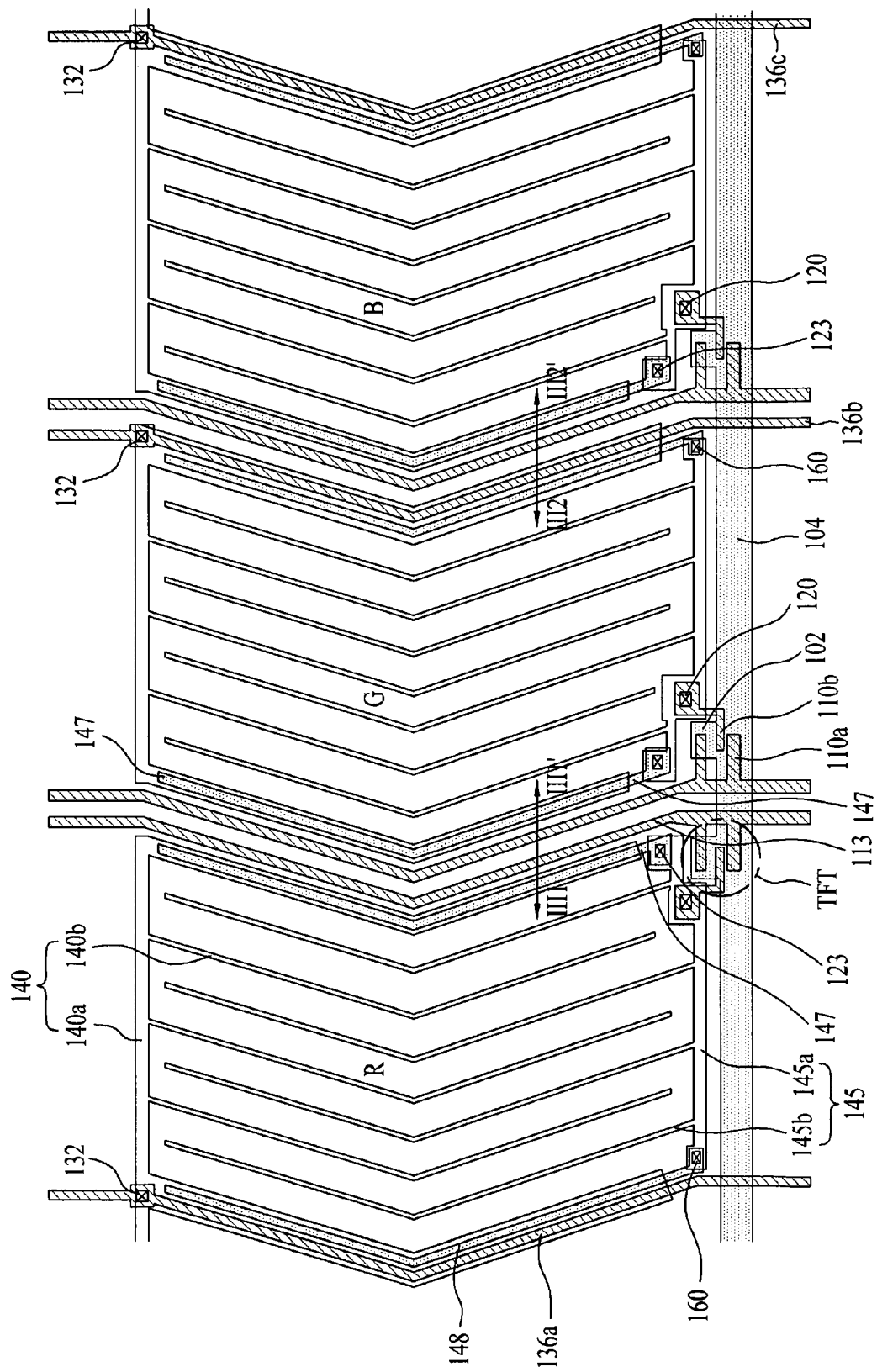

Referring to FIG. 7A, the data lines 113 respectively formed in the R and G sub-pixel regions of each pixel region are arranged adjacent to each other. Also, the thin film transistors TFT respectively formed in the R and G sub-pixel regions of each pixel region are arranged adjacent to each other. The data line 113 formed in the B sub-pixel region of each pixel region is arranged at the left side of the B sub-pixel region, namely, between the G and B sub-pixel regions. In each pixel region, the corresponding vertical common line includes a first vertical common line 136a formed at the left side of the R sub-pixel region, a second vertical common line 136b formed at the right side of the G sub-pixel region such that the second vertical common line 136b is arranged adjacent to the B sub-pixel region, and a third vertical common line 136c formed at the right side of the B sub-pixel region such that the third vertical common line 136c is arranged adjacent to the R sub-pixel region.

Since a common voltage from the driver IC is directly applied to the first, second, and third second vertical common lines 136a, 136b, and 136c, it is possible to prevent the common voltage from being distorted.

The storage electrode formed in each pixel region includes a first storage electrode 147 formed at one side of the data line 113 in each sub-pixel region such that the storage electrode 147 is parallel to the data line 113, and second storage electrodes 148 each formed at one side of the corresponding one of the first and second vertical common lines 136a and 136b. The first vertical common line 136a and the second storage electrode 148 corresponding thereto are formed to overlap with the finger portion 140b of the common electrode 140 in the R sub-pixel region. The second vertical common line 136b and the second storage electrode 148 corresponding thereto are formed to overlap with the finger portion 140b of the common electrode 140 in the G sub-pixel region. The second storage electrodes 148 are connected to the horizontal portion 145a of the corresponding pixel electrode 145 via second storage contact holes 160, respectively.

The first and second storage electrodes 147 and 148 overlap with the finger portion 140b of the corresponding common electrode 140 under the condition in which the gate insulating film ("106" in FIG. 5) and the passivation film ("125" in FIG. 5) are interposed between the first and second storage electrodes 147 and 148. Thus, first and second storage capacitors are formed.

In the LCD device, in which each pixel region includes a pair of data lines 113 arranged adjacent to each other, a first storage electrode 147 formed at one side of each data line 113, a vertical common line formed in each sub-pixel region, and a second storage electrode 148 formed at one side of the vertical common line, the average aperture ratio of each pixel region is about 57 to 59% with respect to a 42-inch high-definition (HD) model.

Figure 7B:
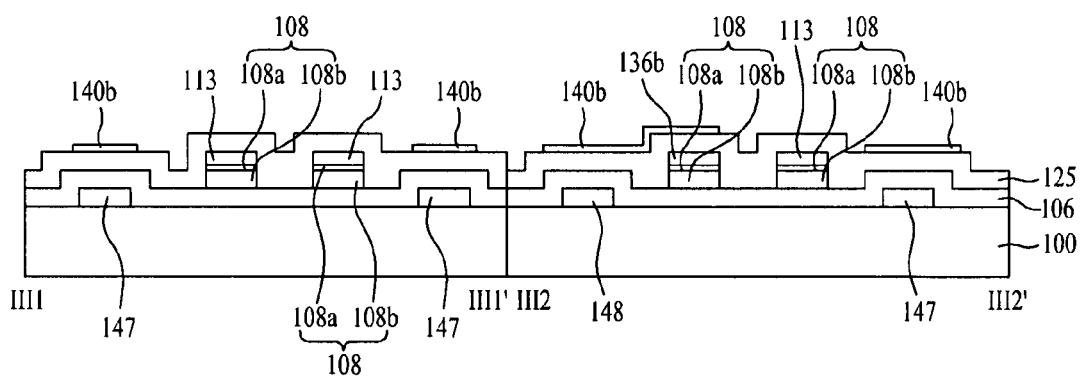

Referring to FIG. 7B, the black matrix (not shown) of the color filter substrate between the R and B sub-pixel regions (III1-III1') has a line width larger than that of the black matrix between the G and B sub-pixel regions (III2-III2').

In other words, in the region between the R and G sub-pixel regions, the data lines 113 are formed such that the data lines 113 are arranged adjacent to each other, and one first storage electrode 147 is formed at one side of each data line 113. In this region, the black matrix (not shown) has a line width of 50 to 62 μm. In the region between the G and B sub-pixel regions, the data lines 113, first storage electrodes 147, second vertical common line 136b, and second storage electrodes 148 are formed. In this region, the black matrix (not shown) has a line width of 30 to 45 μm. In this case, the black matrix (not shown) is formed such that the ratio of the minimum line width to the maximum line width is 0.7 or less.

Since the black matrix (not shown) is formed such that the ratio of the minimum line width to the maximum line width is 0.7 or less, as described above, it is possible to solve a visibility problem caused by a line width difference in the black matrix. Also, the sub-pixel regions have the same aperture width. Accordingly, it is possible to reduce a color deviation and color mixing among the sub-pixel regions.

Figure 8A:
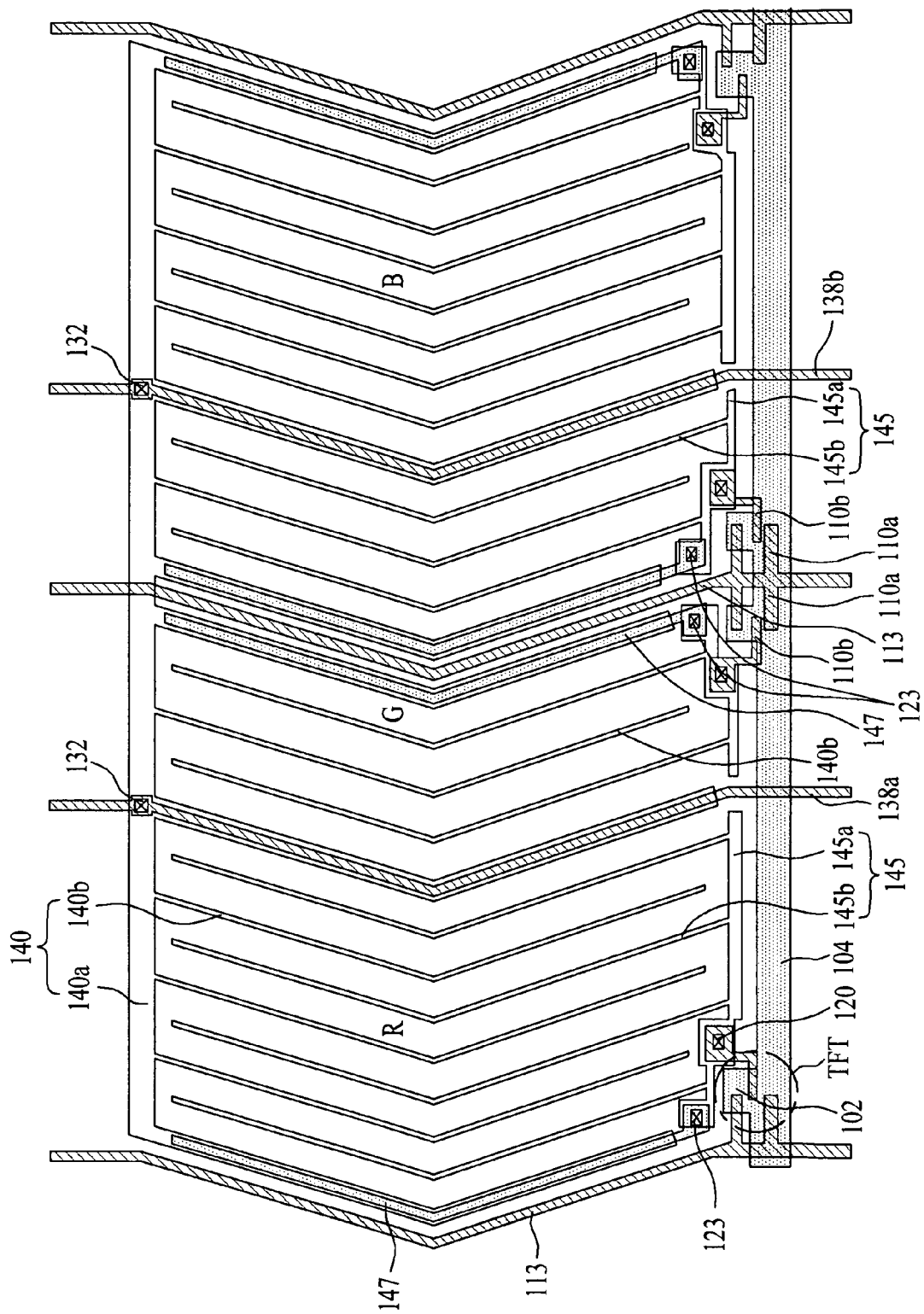

Referring to FIG. 8A, the data line 113 and thin film transistor TFT formed in each R sub-pixel region are arranged at the left side of the R sub-pixel region. On the other hand, the data line 113 and thin film transistor TFT formed in each B sub-pixel region are arranged at the right side of the B sub-pixel region. That is, the data lines formed in the R and B sub-pixel regions are arranged adjacent to each other. Also, the thin film transistors TFT formed in the R and B sub-pixel regions are arranged adjacent to each other.

Each G sub-pixel region includes two thin film transistors TFT sharing one data line 113, pixel electrodes 145 respectively connected to the thin film transistors TFT, common electrodes 140 respectively having finger portions 140b forming a horizontal electric field, together with the finger portions 145b of the pixel electrodes 145, and storage electrodes 147 respectively formed at opposite sides of the data line 113.

The storage electrodes 147 are overlapped with the finger portions 140b of the common electrodes 140 at opposite sides of the data line 113, and connected with the horizontal portions 145a of the pixel electrodes 145 via storage contact holes 123, respectively.

In each pixel region, the corresponding vertical common line includes a first vertical common line 138a formed between the R and G sub-pixel regions, and a second vertical common line 138b formed between the G and B sub-pixel regions. The first and second vertical common lines 138a and 138b are formed such that they are overlapped with the finger portions 140b of the common electrodes 140, and connected to the horizontal portions 140a of the common electrodes 140, respectively. Since a common voltage from the driver IC is directly applied to the first and second vertical common lines 138a and 138b, it is possible to prevent the common voltage from being distorted.

In this case, the black matrix (not shown) between the R and B sub-pixel regions has a line width larger than that of the black matrix in the G sub-pixel region. In other words, the black matrix has a line width of 45 to 55 μm in a region corresponding to the data line 113 crossing the G sub-pixel region and in regions corresponding to the storage electrodes 147 formed at opposite sides of the data line 113. The data lines 113 formed in the B and R sub-pixel regions are arranged to each other between the B and R sub-pixel regions. One storage electrode 147 is formed at one side of each of the data lines 113 formed in the B and R sub-pixel regions. The black matrix has a line width of 50 to 62 μm in regions corresponding to the data lines 113 and storage electrodes 147 formed in the B and R sub-pixel regions. In this case, the black matrix is formed such that the ratio of the minimum line width to the maximum line width is 0.7 or less.

Since the black matrix (not shown) is formed such that the ratio of the minimum line width to the maximum line width is 0.7 or less, as described above, it is possible to solve a visibility problem caused by a line width difference in the black matrix. Also, the sub-pixel regions have the same aperture width. Accordingly, it is possible to reduce a color deviation and color mixing among the sub-pixel regions.

In the LCD device, in which each pixel region includes two thin film transistors TFT arranged in the G sub-pixel region, a first vertical common line 138a formed between the R and G sub-pixel regions, and a second vertical common line 138b formed between the G and B sub-pixel regions, the average aperture ratio of each pixel region is about 56 to 58% with respect to a 42-inch high-definition (HD) model.

Since the G sub-pixel region is driven by two thin film transistors TFT in this case, there is a problem of a reduction in aperture ratio, even through a reduction in load can be reduced. To this end, for an enhancement in aspect ratio, the G sub-pixel region may be driven by one thin film transistor TFT, as shown in FIG. 8B, if necessary.

Figure 9:
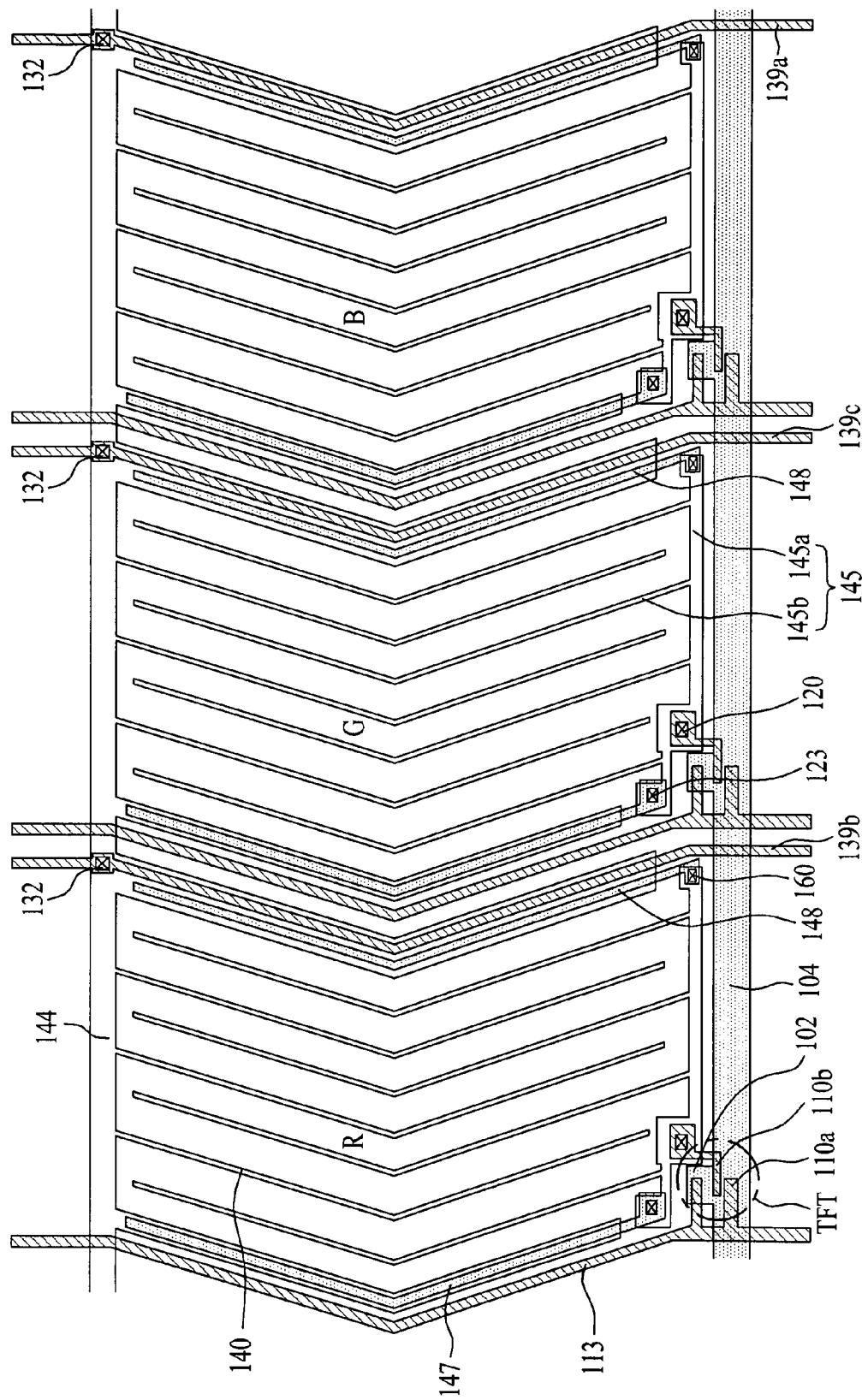

Referring to FIG. 9, one data line 113 and one thin film transistor TFT are formed at the left side of each sub-pixel region.

A first vertical common line 139a is formed at the right side of each B sub-pixel region. A second vertical common line 139b is formed between the R and G sub-pixel regions of each pixel region such that the second vertical common line 139b is arranged adjacent to the data line 113 in the G sub-pixel region. A third vertical common line 139c is formed between the G and B sub-pixel regions of each pixel region such that the third vertical common line 139c is arranged adjacent to the data line 113 in the B sub-pixel region. In other words, the data lines 113 formed in respective sub-pixel regions and the vertical common lines 139a, 139b, and 139c formed in respective sub-pixel regions are arranged such that they are symmetrical to each other.

Since a common voltage from the driver IC is directly applied to the first, second, and third vertical common lines 139a, 139b, and 139c, it is possible to prevent the common voltage from being distorted.

The storage electrode formed in each pixel region includes a first storage electrode 147 formed at one side of the data line 113 in each sub-pixel region such that the first storage electrode 147 is parallel to the data line 113, and second storage electrodes 148 each formed at one side of the corresponding one of the first, second, and third vertical common lines 139a, 139b, and 139c.

Each of the first to third vertical common lines 139a to 139c and the second storage electrode 148 formed at one side of the first to third vertical common lines 139a to 139c are overlapped with the corresponding common electrode 140. The first and second vertical common lines 138a and 138b are connected to the corresponding horizontal common line 144 via common line contact holes 132, respectively. The horizontal common line 144 is made of the same material as the pixel electrodes 145.

In the LCD device, in which each pixel region includes three vertical common lines, the average aperture ratio of each pixel region is about 58 to 60% with respect to a 42-inch high-definition (HD) model.

Figure 10:
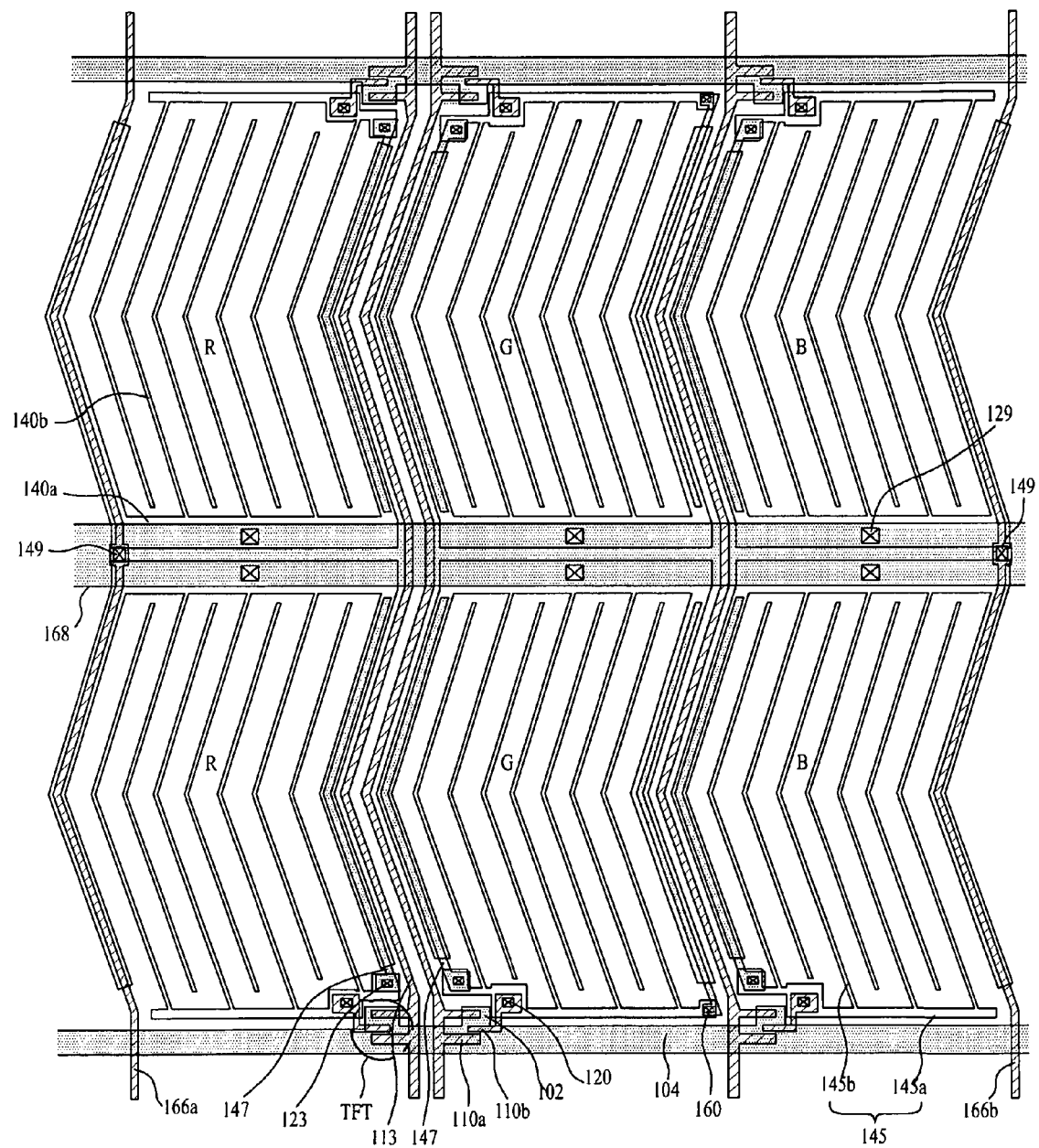
FIGS. 10 and 11 are views illustrating a thin film transistor substrate of an IPS LCD device according to a fourth embodiment of the present invention.
Figure 11:
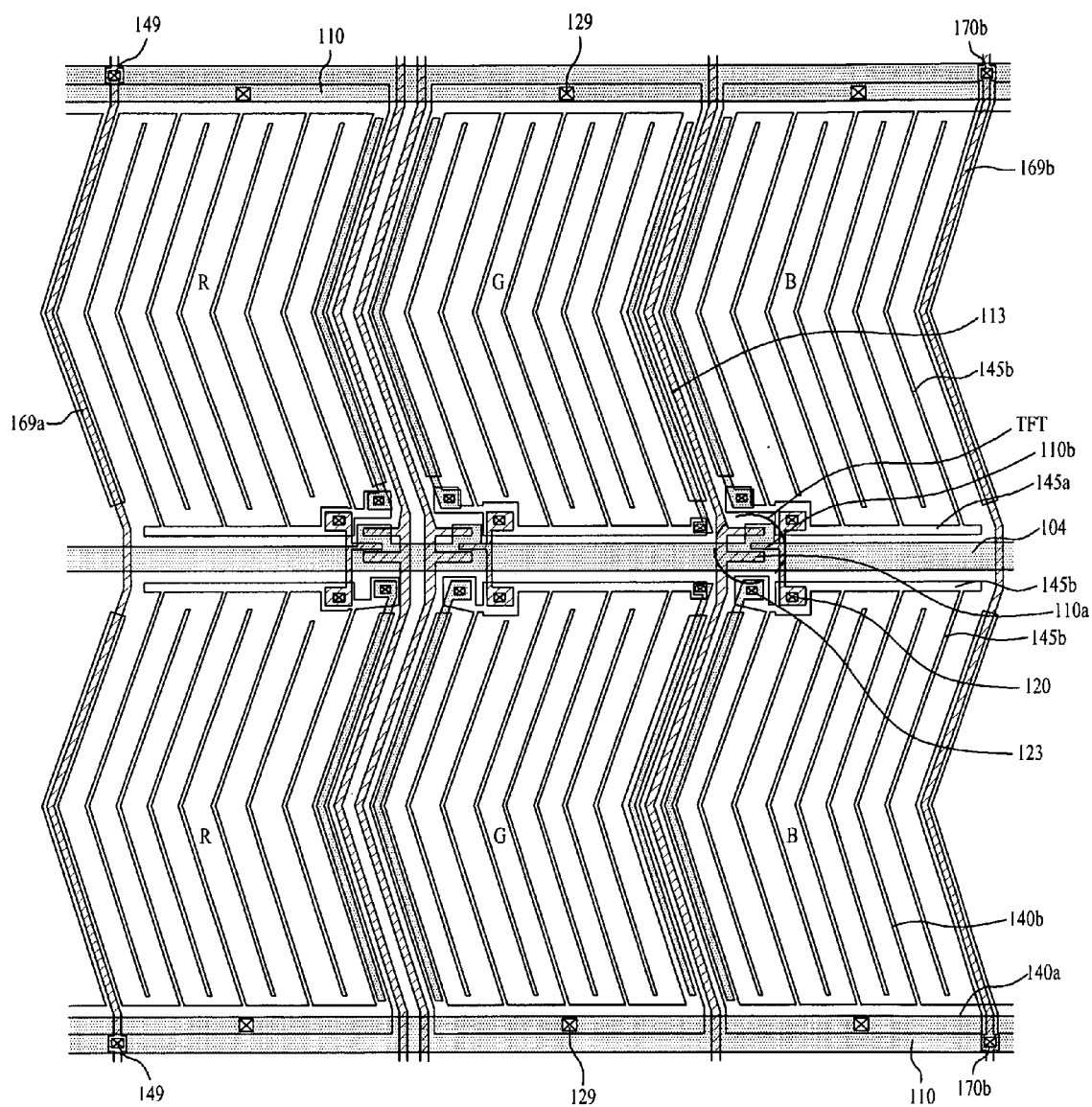

FIGS. 10 and 11 are views illustrating a thin film transistor substrate of an IPS LCD device according to a fourth embodiment of the present invention.

No description will be given of the constituent elements of the IPS LCD device shown in FIGS. 10 and 11, which are identical to those of the previous embodiments.

Referring to FIG. 10, in the region between the R and G sub-pixel regions, the data lines 113 are formed such that they are arranged adjacent to each other. In the region between the R and G sub-pixel regions, the thin film transistors TFT are also formed such that they are arranged adjacent to each other. The data line 113 formed in each B sub-pixel region is arranged between the G and B sub-pixel regions. Horizontal common lines 168 are formed in parallel with the gate lines 104 such that each horizontal common line 168 is shared by two pixel regions vertically arranged adjacent to each other. The horizontal common lines 168 are made of a gate metal material. The horizontal portion 140a of each common electrode 140 in each sub-pixel region is connected with the corresponding horizontal common line 168 via a first common contact hole 129.

Vertical common lines are formed in parallel with the data lines 113 such that each vertical common line is shared by two pixel regions vertically arranged adjacent to each other. The vertical common lines form a mesh structure, together with the horizontal common lines 168. Each vertical common line includes a first vertical common line 166a formed at the left side of the corresponding R sub-pixel region such that the first vertical common line 166a is shared by two pixel regions vertically arranged adjacent to each other, and a second vertical common line 166b formed at the right side of the corresponding B sub-pixel region such that the second vertical common line 166b is shared by the two pixel regions vertically arranged adjacent to each other. The first and second vertical common lines 166a and 166b are connected to the corresponding horizontal common line 169 via second common contact holes 149, respectively. A common voltage from a driver IC is directly applied to the first and second vertical common lines 166a and 166b. Accordingly, it is possible to prevent the common voltage from being distorted.

The pixel regions vertically arranged adjacent to each other are formed to be symmetrical to each other with respect to the corresponding horizontal common line 168.

In this case, the black matrix (not shown) of the color filter substrate between the R and B sub-pixel regions has a line width larger than that of the black matrix between the G and B sub-pixel region. In other words, between the R and G sub-pixel regions, data lines 113 are formed such that they are arranged adjacent to each other, and one first storage electrode 147 is formed at one side of each data line 113. In this region, the black matrix (not shown) has a line width of 50 to 62 μm. In the region between the G and B sub-pixel regions, the data lines 113, and the first and second storage electrodes 147 and 148 arranged at opposite sides of each data line 113 are formed. In this region, the black matrix (not shown) has a line width of 40 to 50 μm. In this case, the black matrix (not shown) is formed such that the ratio of the minimum line width to the maximum line width is 0.7 or less.

Since the black matrix (not shown) is formed such that the ratio of the minimum line width to the maximum line width is 0.7 or less, as described above, it is possible to solve a visibility problem caused by a line width difference in the black matrix. Also, the sub-pixel regions have the same aperture width. Accordingly, it is possible to reduce a color deviation and color mixing among the sub-pixel regions.

In the LCD device, which includes first and second vertical common lines 166a and 166b formed such that they are shared by two pixel regions vertically arranged adjacent to each other, and a horizontal common line 168 forming a mesh structure, together with the first and second vertical common lines 166a and 166b, the average aperture ratio of each pixel region is about 55 to 57% with respect to a 42-inch high-definition (HD) model.

Since the horizontal common lines 168 connected to the horizontal portions 140a of the corresponding common electrodes 140 form a mesh structure, together with the first and second vertical common lines 166a and 166b, it is possible to achieve a reduction in load, and thus to minimize the load.

Referring to FIG. 11, the gate lines 104 and thin film transistors TFT are formed such that they are shared by two pixel regions vertically arranged adjacent to each other. That is, the vertically-arranged sub-pixel regions of the two pixel regions are simultaneously driven by one thin film transistor TFT. Common electrodes 140 are formed in respective sub-pixel regions of the corresponding pixel region such that each common electrode 140 includes a horizontal portion 140a and a finger portion 140b. Horizontal common lines 110 are also formed over and beneath the vertically-adjacent pixel regions such that they are parallel to the gate lines 104. The horizontal portion 140a of each common electrode 140 and each horizontal common line 110 are connected to the sub-pixel regions of the corresponding pixel region via first common contact holes 129.

The horizontal common lines 110 are connected to the first and second vertical common lines 169a and 169b in the corresponding vertically-adjacent pixel regions via second common contact holes 149, thereby forming a mesh structure.

Each first vertical common line 169a is formed in parallel to the data lines such that it connects the vertically-adjacent pixel regions at the left side of the corresponding sub-pixel regions of the vertically-adjacent pixel regions. Each second vertical common line 169b is formed such that it connects the vertically-adjacent pixel regions at the right side of the B sub-pixel regions of the vertically-adjacent pixel regions. A common voltage from a driver IC is directly applied to the first and second vertical common lines 169a and 169b. Accordingly, it is possible to prevent the common voltage from being distorted.

The vertically-adjacent pixel regions are formed to be symmetrical to each other with respect to the corresponding gate line 104.

In this case, the line width of the black matrix (not shown) of the color filter substrate between the R and B sub-pixel regions and the line width of the black matrix between the G and B sub-pixel region are identical to those of FIG. 10.

In the LCD device, which includes first and second vertical common lines 166a and 166b formed to be shared by the vertically-adjacent pixel regions, and horizontal common lines 110 forming a mesh structure, together with the first and second vertical common lines 166a and 166b, the average aperture ratio of each pixel region is about 55 to 57% with respect to a 42-inch high-definition (HD) model.

Since the horizontal common lines 110 connected to the horizontal portions 140a of the corresponding common electrodes 140 form a mesh structure, together with the first and second vertical common lines 169a and 169b, it is possible to achieve a reduction in load, and thus to minimize the load.

Figure 12:
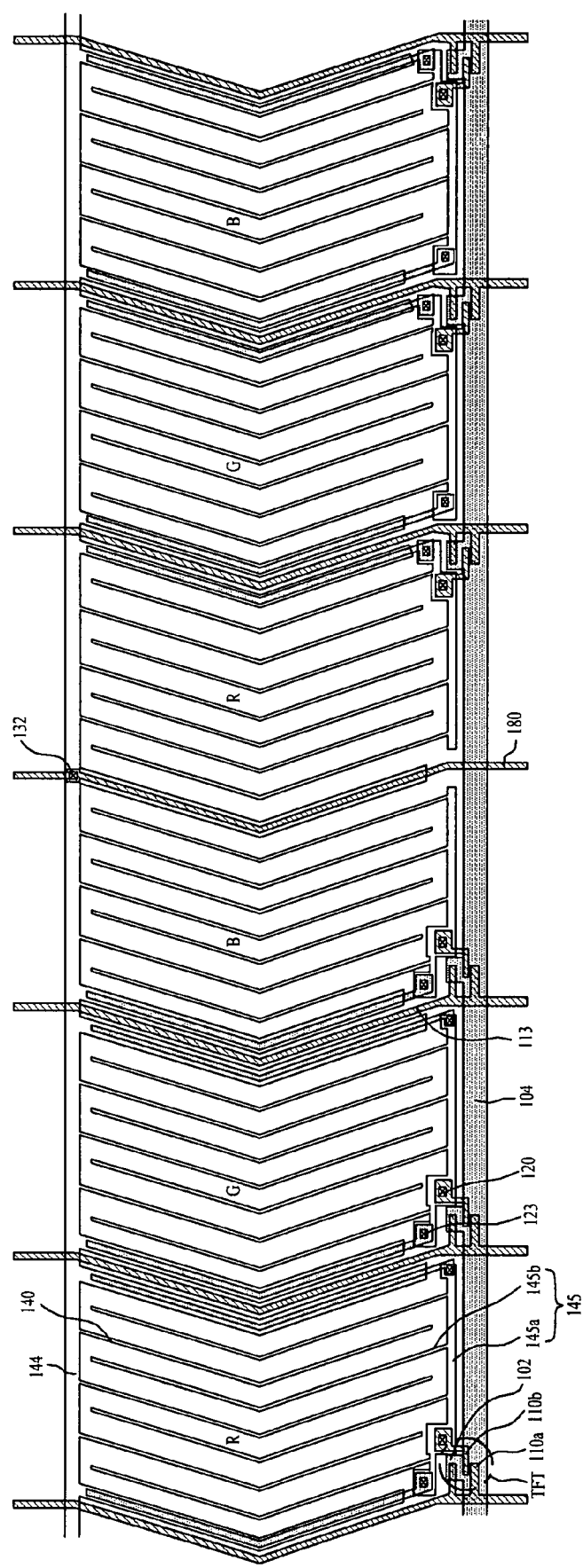
FIG. 12 is a plan view illustrating a thin film transistor substrate of an IPS LCD device according to a fifth embodiment of the present invention.

FIG. 12 is a plan view illustrating a thin film transistor substrate of an IPS LCD device according to a fifth embodiment of the present invention.

Referring to FIG. 12, vertical common lines 180 are formed such that each vertical common line 180 is shared by two pixel regions laterally adjacent to each other. Horizontal common lines 144 are formed using the same material as the pixel electrodes 145. Each horizontal common line 144 is connected with the sub-pixel regions of the pixel regions. A common voltage from a driver IC is directly applied to the first and second vertical common lines 166a and 166b. Accordingly, it is possible to prevent the common voltage from being distorted. The vertical common lines 180 are connected with the horizontal common lines 144 via common line contact holes 132, thereby forming a mesh structure. The laterally-adjacent pixel regions are formed to be symmetrical to each other with respect to the corresponding vertical common line 180.

In the LCD device, which includes vertical common lines 180 each formed to be shared by the corresponding laterally-adjacent pixel regions, the average aperture ratio of each pixel region is about 56 to 58% with respect to a 42-inch high-definition (HD) model.

Since the vertical common lines 180 and horizontal common lines 144 form a mesh structure, it is possible to achieve a reduction in load, and thus to minimize the load.

Meanwhile, among the embodiments of the LCD device according to the present invention, the embodiment, in which the aperture ratio is 60 to 62%, as shown in FIGS. 4 to 6, provides a most ideal structure.

As apparent from the above description, the LCD device according to the present invention achieves an enhancement in aperture ratio corresponding to about 10 to 16% by forming common lines and storage electrodes in parallel to data lines, as compared to the case in which common lines and storage electrodes are formed over and beneath each pixel region. Since an increase in brightness is achieved in accordance with the enhanced aperture ratio, it is possible to eliminate the use of a diffusion sheet or a prism sheet. Also, it is possible to obtain a high aperture ratio, without using an organic insulating material such as expensive photo acryl. Thus, a reduction in costs and processes is achieved.

In accordance with the present invention, the length of the common lines is reduced, as compared to the case in which the common lines are formed to be parallel to the gate lines. Accordingly, the resistance of the common lines is reduced. As a result, it is possible to prevent the common voltage from being distorted or delayed, and to reduce a flicker phenomenon caused by the resistance of the common lines and capacitance.

Since the common lines are formed to be parallel to the data lines, there is no cross-talk caused by a parasitic capacitor formed between the gate lines and the common lines in conventional cases. It is also possible to eliminate direct current (DC) components from the common electrodes, and thus to solve an associated problem such as image sticking.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A liquid crystal display device comprising:
   gate lines;
   data lines formed to intersect with the gate lines, thereby defining sub-pixel regions;
   vertical common lines formed in parallel to the data lines such that at least one vertical common line is arranged for one pixel region, which is constituted by at least three sub-pixel regions;
   thin film transistors each connected to a corresponding one of the gate lines and a corresponding one of the data lines;
   pixel electrodes each connected to a corresponding one of the thin film transistors;
   common electrodes each connected to a corresponding one of the vertical common lines; and
   storage electrodes each formed in parallel with the data lines at least one side of a corresponding one of the data lines and a corresponding one of the vertical common lines and formed in a layer different from the layer on which the data lines are formed.

2. The liquid crystal display device according to claim 1, wherein the storage electrodes are made of the same material as the gate lines.

3. The liquid crystal display device according to claim 1, wherein each of the data lines is formed to cross at least one of the sub-pixel regions.

4. The liquid crystal display device according to claim 3, wherein the thin film transistors are connected to each of the data lines while being arranged at left and right sides of the data line.

5. The liquid crystal display device according to claim 1, wherein the vertical common lines are made of the same material as the data lines.

6. The liquid crystal display device according to claim 1, wherein each of the vertical common lines is formed to cross at least one of the sub-pixel regions.

7. The liquid crystal display device according to claim 1, wherein each of the vertical common lines is formed to be shared by sub-pixel regions horizontally arranged adjacent to each other at opposite sides of the vertical common line.

8. The liquid crystal display device according to claim 1, wherein each of the gate lines is formed to be shared by pixel regions vertically arranged adjacent to each other at opposite sides of the gate line and is formed to intersect with the data lines, thereby defining two sub-pixel regions between the gate lines.

9. The liquid crystal display device according to claim 1, further comprising:
   horizontal common lines each formed in parallel to the gate lines and connected to the vertical common lines.

10. The liquid crystal display device according to claim 9, wherein the horizontal common lines are made of the same material as the pixel electrodes or made of the same material as the gate lines.

11. The liquid crystal display device according to claim 9, wherein each of the horizontal common lines is formed to be shared by pixel regions vertically arranged adjacent to each other at opposite sides of the horizontal common line.

12. The liquid crystal display device according to claim 1, wherein black matrixes respectively formed in a region between the first and second sub-pixel regions of the at least three sub-pixel regions and in a region between the second and third sub-pixel regions of the at least three sub-pixel regions have a line width ratio of 0.7 or less.

* * * * *